(12) United States Patent
Bruno et al.

(10) Patent No.: US 8,936,071 B2
(45) Date of Patent: Jan. 20, 2015

(54) HYBRID COOLING SYSTEM FOR AIRCRAFT APPLICATIONS

(75) Inventors: Louis J. Bruno, Ellington, CT (US); Douglas L. Christians, Vernon, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 1432 days.

(21) Appl. No.: 12/615,656

(22) Filed: Nov. 10, 2009

(65) Prior Publication Data
US 2011/0108239 A1  May 12, 2011

(51) Int. Cl.
| | |
|---|---|
| F28D 15/00 | (2006.01) |
| B60H 1/32 | (2006.01) |
| F25D 17/02 | (2006.01) |
| F25D 9/00 | (2006.01) |
| F25B 25/00 | (2006.01) |
| F25D 17/00 | (2006.01) |
| F25D 11/02 | (2006.01) |
| F25B 7/00 | (2006.01) |
| B64D 13/06 | (2006.01) |

(52) U.S. Cl.
CPC ........ *B64D 13/06* (2013.01); *B64D 2013/0674* (2013.01); *B64D 2013/0614* (2013.01); *B64D 2013/0618* (2013.01); *B64D 2013/0629* (2013.01); *B64D 2013/0644* (2013.01); *Y02T 50/56* (2013.01); *Y10S 62/05* (2013.01)
USPC .............. 165/104.19; 62/DIG. 5; 62/244; 62/185; 62/401; 62/332; 62/333; 62/334; 62/335

(58) Field of Classification Search
CPC ...... Y10S 62/05; B64D 13/08; B64D 13/006; B64D 13/06
USPC .................. 62/185, 244, 332–335, 401, 402, 62/DIG. 5; 165/104.19
See application file for complete search history.

(56) References Cited

U.S. PATENT DOCUMENTS

| | | | | |
|---|---|---|---|---|
| 4,263,786 | A | * | 4/1981 | Eng .................................... 62/87 |
| 4,553,407 | A | * | 11/1985 | Rannenberg .................... 62/402 |
| 5,906,111 | A | * | 5/1999 | Lui .................................... 62/402 |
| 5,918,472 | A | * | 7/1999 | Jonqueres ......................... 62/87 |
| 6,250,097 | B1 | * | 6/2001 | Lui et al. ......................... 62/402 |
| 6,457,318 | B1 | * | 10/2002 | Lui et al. ........................... 62/87 |
| 6,519,969 | B2 | | 2/2003 | Sauterleute |
| 6,629,428 | B1 | | 10/2003 | Murry |

(Continued)

FOREIGN PATENT DOCUMENTS

FR    2894563    6/2007

OTHER PUBLICATIONS

European Search Report for European Application No. 10251913.9 completed on Apr. 2, 2014.

*Primary Examiner* — Allen Flanigan
*Assistant Examiner* — Filip Zec
(74) *Attorney, Agent, or Firm* — Carlson, Gaskey & Olds

(57) ABSTRACT

An aircraft cooling system includes a refrigerant cycle including a first heat exchanger. A liquid cycle passes a liquid through the first heat exchanger, at which it is cooled by a refrigerant in the refrigerant cycle. An air cycle compresses air and delivers the compressed air into a second heat exchanger. The liquid passes through the second heat exchanger at a location downstream of the first heat exchanger. The liquid cools the air in the second heat exchanger. Air downstream of the second heat exchanger passes to be utilized by a use on an aircraft.

4 Claims, 1 Drawing Sheet

(56) References Cited

U.S. PATENT DOCUMENTS

| | | |
|---|---|---|
| 6,796,527 B1 | 9/2004 | Munoz et al. |
| 6,845,630 B2 | 1/2005 | Bruno et al. |
| 6,848,261 B2 * | 2/2005 | Claeys ............................... 62/87 |
| 6,921,047 B2 | 7/2005 | McColgan et al. |
| 6,971,607 B2 | 12/2005 | McColgan et al. |
| 7,305,842 B1 | 12/2007 | Schiff |
| 2006/0059942 A1 | 3/2006 | McAuliffe et al. |
| 2008/0032616 A1 * | 2/2008 | Vogel ............................... 454/74 |
| 2008/0242209 A1 | 10/2008 | Steinmaier et al. |
| 2009/0000328 A1 * | 1/2009 | Scherer et al. .................. 62/335 |

* cited by examiner

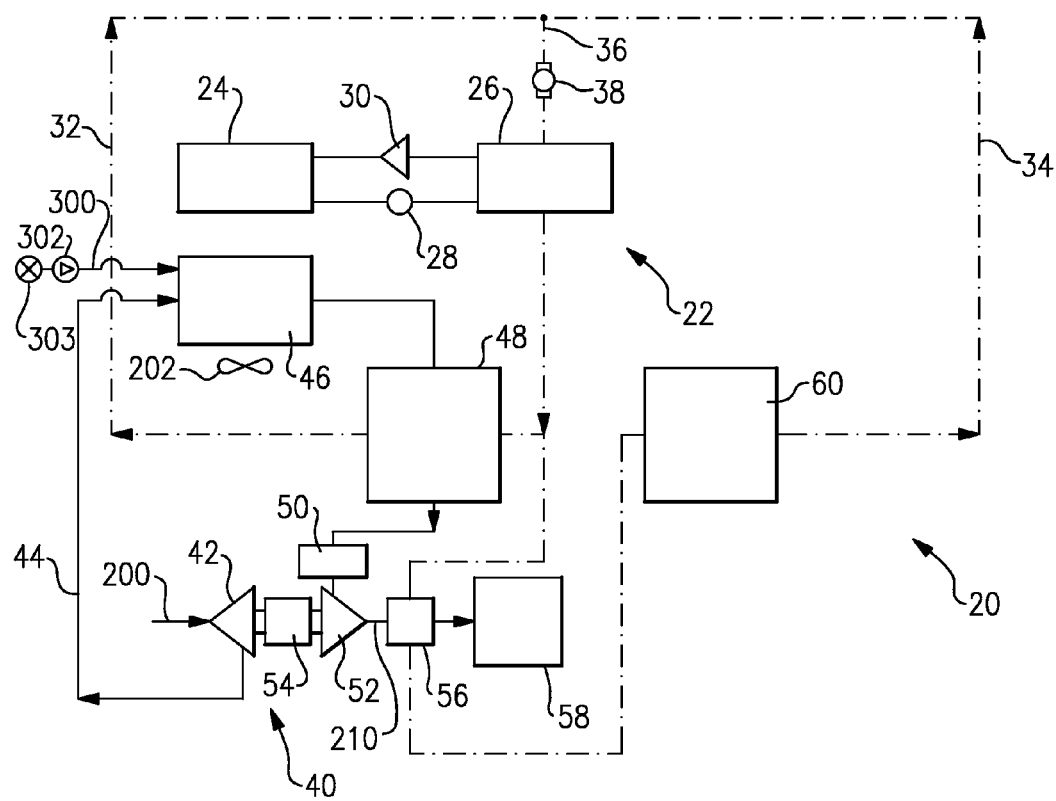

HYBRID COOLING SYSTEM FOR AIRCRAFT APPLICATIONS

BACKGROUND OF THE INVENTION

This application relates to an aircraft cooling system that combines a vapor cycle, a liquid cycle, and an air cycle.

Aircraft are being provided with more and more auxiliary functions. With these auxiliary functions, cooling loads must be handled.

Modern aircraft are typically provided with an air cycle system which provides cool air. The air is delivered to cabins as breathing air, and to cool electronic equipment, etc. Typically, the air cycle system takes in outside air, cools that air, and then delivers it to its uses.

Separately from the air cycle, aircraft can also have a vapor cycle refrigerant system. The vapor cycle refrigerant system can operate to cool a liquid in a liquid cycle. The liquid is utilized to provide cooling at various loads such as the galley on commercial airlines, or to cool avionics in military aircraft.

To date, aircraft have been provided with separate cooling systems incorporating these three basic systems.

SUMMARY OF THE INVENTION

An aircraft cooling system includes a refrigerant cycle including a first heat exchanger. A liquid cycle passes a liquid through the first heat exchanger, at which it is cooled by a refrigerant in the refrigerant cycle. An air cycle compresses air and delivers the compressed air into a second heat exchanger. The liquid passes through the second heat exchanger at a location downstream of the first heat exchanger. The liquid cools the air in the second heat exchanger. Air passes downstream of the liquid heat exchanger to be utilized by a use on an aircraft.

These and other features of the present invention can be best understood from the following specification and drawings, the following of which is a brief description.

BRIEF DESCRIPTION OF THE DRAWINGS

FIG. 1 shows a schematic of a hybrid cooling system for an aircraft.

DETAILED DESCRIPTION OF THE PREFERRED EMBODIMENT

FIG. 1 shows an aircraft 20 having an integrated cooling system incorporating a vapor refrigerant cycle 22. A condenser 24 is provided with a fan to pass heat into the outside atmosphere. Refrigerant passes to the condenser 24 from a compressor 30. Downstream of the condenser 24, the refrigerant passes through an expansion device 28, and then into an evaporator 26. In the evaporator 26, the refrigerant cools a liquid in a liquid cooling cycle from line 36. A pump 38 is provided on line 36 to drive the liquid through the evaporator 26 for cooling.

An air cycle 40 takes in outside air at 200 to a compressor 42. The compressed air is delivered into a line 44 to a primary heat exchanger 46. A fan 202 passes outside air over the primary heat exchanger 46, such that the air is cooled in the heat exchanger 46. In addition, the heat exchanger 46 could receive another source of air 300 from a compressor 301 powered by a motor 303. Air from the atmosphere at 302 enters the compressor 301, is compressed, and delivered to the heat exchanger 46 through the line 300. The air is then delivered downstream into an air moisture condensing heat exchanger 48. The liquid from the liquid cooling system branches from the main line 36, downstream of the evaporator 26, such that a portion of it passes through a line 32 and through the heat exchanger 48. This further cools the air in the heat exchanger 48. The air downstream of the heat exchanger 48 passes through a water extractor 50, and then to a turbine 52. The air is expanded across the turbine 52, thus further cooling the air. The air may then be delivered through line 210 to use 58, such as a cabin space or a space to cool equipment. A motor 54, in combination with the turbine 52, operates to drive the compressor 42.

An intermediate heat exchanger 56 is shown downstream of the turbine 52. The heat exchanger 56 also receives a portion of the cooled liquid, and in the disclosed embodiment, the portion which does not pass to the heat exchanger 48. The liquid is further cooled in the heat exchanger 56. The liquid downstream of the heat exchanger 56 passes to the liquid uses or loads 60, which may include a galley cooling system, avionics, etc. The liquid returns through line 34 to line 36.

The present invention thus incorporates a hybrid system wherein the liquid cooling system is utilized to cool the air cycle system. The synergistic benefits of combining the systems include the reduction of parts, and the more efficient provision of the cooled fluids to the several uses.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An aircraft cooling system comprises:
    a refrigerant cycle, said refrigerant cycle including a first heat exchanger;
    a liquid cycle, said liquid cycle passing a liquid through said first heat exchanger, at which it is cooled by a refrigerant in the refrigerant cycle;
    an air cycle including a compressor for compressing air and delivering compressed air into a primary heat exchanger, and a fan to drive cooling air over said primary heat exchanger to cool the compressed air, the compressed air then being delivered into a second heat exchanger, and liquid passing through said second heat exchanger at a location downstream of said first heat exchanger, and the liquid for cooling the air in said second heat exchanger, air downstream of said second heat exchanger passing to be utilized by an air use on an aircraft;
    said air cycle includes a turbine downstream of said second heat exchanger, and air having been cooled in said second heat exchanger driving said turbine to expand the air, and at least partially power said compressor;
    a water extractor is positioned downstream of said second heat exchanger, and upstream of said turbine;
    a liquid supply line branches to at least two destinations downstream of said first heat exchanger, with one branch passing through said second heat exchanger, and another branch passing to a liquid use for cool liquid; and
    said air cycle includes a third heat exchanger downstream of said second heat exchanger, and a portion of the liquid which is not delivered to said second heat exchanger passing through said third heat exchanger prior to passing to the liquid use.

2. The aircraft cooling system of claim 1, wherein the air use is one of at least a portion of the air being delivered into a passenger cabin on an associated aircraft, or being used to cool a component on an associated aircraft.

3. A combined system for providing cooling fluids to an aircraft comprising:
- a vapor cycle, said vapor cycle including a condenser receiving a compressed refrigerant from a compressor, and an expansion device downstream of said condenser, refrigerant passing from said condenser to said expansion device and into an evaporator;
- a liquid cycle, said liquid cycle passing through said evaporator to be cooled by the refrigerant in said evaporator, a first portion of the liquid then passing to an air moisture condensing heat exchanger, and a second portion of the liquid branching to a liquid use, wherein the cooled liquid is utilized to cool components;
- an air cycle including a compressor receiving air from an outside source and compressing the air, the compressed air being delivered through a primary heat exchanger, wherein heat is exchanged from the compressed air to an outside environment by passing outside air over said primary heat exchanger, and air having passed through said primary heat exchanger passing through said air moisture condensing heat exchanger at which it is further cooled by the liquid, and air from said air moisture condensing heat exchanger then passing through a turbine to drive said turbine, and at least partially drive said compressor, air from said turbine passing to an enclosed space for use of a cooled air;
- said enclosed space includes providing air on an associated aircraft into a passenger cabin; and
- said second portion of liquid passing through an intermediate heat exchanger, and then to the liquid load, and air downstream of said turbine passing through said intermediate heat exchanger.

4. The aircraft cooling system of claim 2, wherein said air use includes at least a portion of the air being delivered into a passenger cabin.

* * * * *